United States Patent [19]

Wright

[11] 4,340,976

[45] Jul. 27, 1982

[54] FILIGREED BELT AND PROCESS

[75] Inventor: Jerry D. Wright, Comanche, Tex.

[73] Assignee: Wright Leather Goods Manufacturing Co., Comanche, Tex.

[21] Appl. No.: 82,870

[22] Filed: Oct. 9, 1979

[51] Int. Cl.³ .......................... A41F 9/00; B32B 9/02; A41D 27/08; G09F 9/30

[52] U.S. Cl. .......................................... 2/338; 428/14; 428/187; 428/138; 428/473; D2/392; D2/380; 40/595; 40/618; 40/2 E; 40/306; 156/265; 156/299; 224/224; 150/0.5; 40/360; 40/21 C; 40/586

[58] Field of Search .................................. 2/338, 311; D2/392-394, 380; 156/299, 265; 40/21 C, 586, 594, 595, 618; 428/138, 473, 44, 45, 47, 48, 51, 14, 904, 187

[56] References Cited

U.S. PATENT DOCUMENTS

| | | | |
|---|---|---|---|
| 743,984 | 11/1903 | Knothe | 2/380 |
| 1,430,682 | 10/1922 | Pollak | 40/21 C |
| 1,851,491 | 3/1932 | Brown | 40/21 C |
| 2,427,119 | 9/1947 | Bensel | 2/338 |
| 3,315,387 | 4/1967 | Heuser | 40/595 X |
| 4,144,594 | 3/1979 | Chapman | 2/338 |
| 4,177,587 | 12/1979 | Dorsen et al. | 40/594 X |
| 4,178,879 | 12/1979 | Cunningham | 40/21 C |
| 4,295,231 | 10/1981 | Wright | 2/338 |

*Primary Examiner*—George F. Lesmes
*Assistant Examiner*—Alexander S. Thomas
*Attorney, Agent, or Firm*—Arthur F. Zobal

[57] ABSTRACT

A filigreed effect name plate is formed on a belt or other leather product. The belt comprises an outer layer attached to one or more other layers. The name plate area is removed from the outer layer prior to attachment to the other layer or layers leaving an opening formed through the outer layer for receiving precut letters, symbols, or other indicia. The precut indicia are inserted in the opening and their back sides bonded to the layer exposed through the opening. In addition, the top and bottom edges of the indicia are bonded to the top and bottom edges of the opening respectively.

57 Claims, 3 Drawing Figures

21A
21B
21
23
25
27
29
31
33
35
37
39
39A
39B
41
43
45
47
49
51
53
54
55
57
59
61

FILIGREED BELT AND PROCESS

FIELD OF THE INVENTION

The present invention relates to filigreed leather products such as belts and to a process of making such products.

DESCRIPTION OF THE PRIOR ART

In recent years, leather products such as belts have been filigreed by removing leather to form various designs in the products. Generally, the design is formed by cutting leather out around the design, however, the design itself may be removed leaving an opening which defines the design. Previously, the filigreeing was formed with hand tools, however, recently it has been automated with dies. Generally, the belts are formed of several layers with the outer layer filigreed and the next layer forming a background for the design. The filigreeing is carried out at the manufacturing facility. For belts having name plates, a name plate area is left on the outer layer of the belts to allow the retailer to form individual names by a printing, stenciling or embossing process.

U.S. Pat. No. 4,144,594 discloses a process for filigreeing names in the name plate area. The process, however, is slow and tedious and is intended to be carried out by the retailer who generally does not have the necessary skills.

SUMMARY OF THE INVENTION

It is an object of the present invention to provide a highly efficient process for forming a belt or other leather product having distinctive letters, symbols, or other indicia which exhibits a filigreed effect.

It is a further object of the present invention to provide such a product formed by said process. The product formed comprises an outer layer attached to one or more other layers.

In carrying out the process, an opening is formed through said outer layer and which opening has first and second opposite edges. The outer layer then is attached to the other layers and precut indicia are inserted in said opening with the back side of said indicia engaging and being bonded to the layer exposed through said opening and with said first and second opposite edges of said indicia engaging and being bonded to said first and second opposite edges of said opening respectively.

The product formed comprises said outer layer attached to said one or more other layers with said opening formed through said outer layer. Precut indicia are located in said opening with the back side of said indicia engaging and being bonded to said the layer exposed through said opening and with said first and second opposite edges engaging and being bonded to said first and second opposite edges of said opening.

DESCRIPTION OF THE PREFERRED EMBODIMENTS

Figures 1, 2, 3:
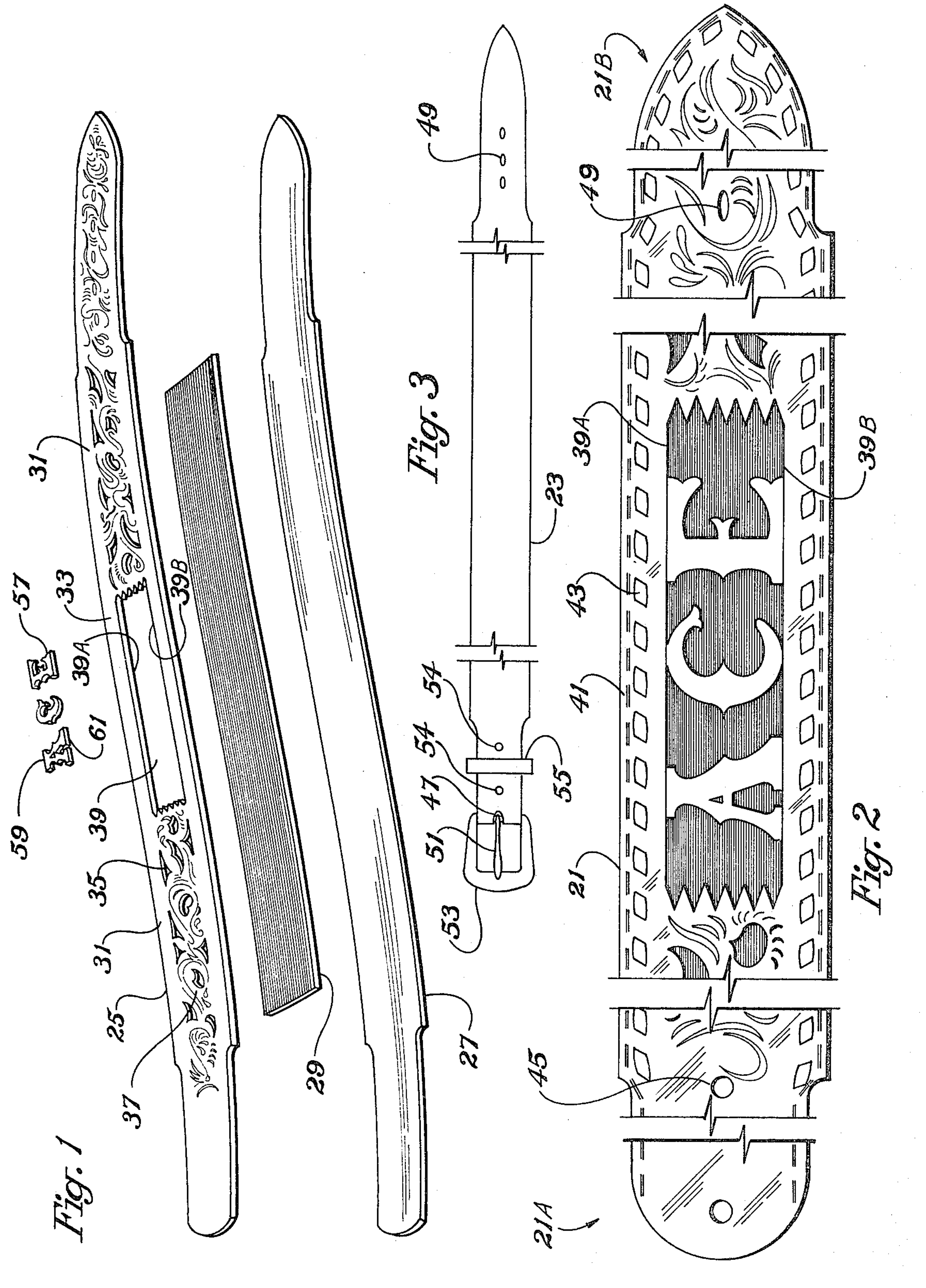
FIG. 1 is a plan view of a belt member constructed in accordance with the present invention.
FIG. 2 is an exploded view of said belt member of FIG. 1 illustrating the manner of production thereof.
FIG. 3 illustrates a completed belt in outline form.

Referring now to the drawings, there is illustrated a leather product in the form of a belt member 21 which is employed to form a belt illustrated in outline form at 23 in FIG. 3. The belt member 21 comprises an outer layer 25 attached to an inner layer 27 with an intermediate layer 29 sandwiched in between. Layers 25, 27, and 29 are formed of leather with layer 29 being of suede which has a color different from that of layer 25 to provide a contrasting background. In forming the belt member 21, layers 25, 27, and 29 first are cut from suitable stock. A design illustrated at 31 is formed in layer 25 leaving a blank intermediate name plate area 33. The design is formed by cutting out leather leaving the openings 35 which define the design. The remainder of the design may be formed by a well known printing, stenciling or embossing process to form the design lines 37. Design lines 37 may be formed before openings 35 are formed. Suitable dies may be used to remove the leather to form the openings 35. A suitable die also is employed to remove leather from the name plate area 33 to form a rectangular shaped opening 39. After this "filigreeing" has been done to layer 25, layers 25, 27, and 29 are sewn together with thread illustrated at 41 in FIG. 2. Holes 43 than may be punched to simulate lacing. In addition, holes 45 and 47 (see FIG. 3) are punched in end 21A and holes 49 are punched in end 21B of belt member 21. Holes 47 receive the tongue 51 of a buckle 53 and holes 45 receive snaps or rivets 54 for holding the buckle 53 in place as well as a loop 55. Holes 49 receive the tongue 51 of the buckle when the belt is worn by a person.

Also provided are precut letters 57 or other indicia adapted to be located in opening 39 against the suede layer 29 exposed through the opening 39. The letters 57 are cut from leather stock with a suitable die. Their heights are such that their upper and lower edges 59 and 61 will engage the upper and lower edges 39A and 39B of opening 39 when they are located in the opening. The letters 57 are bonded to the belt with a suitable glue which preferably has an epoxy base. One type of glue that may be used is Bardge All Purpose Cement. Bonding may be carried out by placing the glue on the back sides of the letters 57 and on their top and bottom edges 59 and 61 and then locating the letters in the opening with their back sides engaging layer 29 and their top and bottom edges 59 and 61 engaging the top and bottom edges 39A and 39B of opening 39. In order to facilitate bonding, pressure is applied to the letters for a short period of time with a toggle press. It is important to bond not only the back sides of the letters to layer 29 but also the top and bottom edges of the letters to the top and bottom edges of the opening to insure that the letters will be properly secured in place. Where possible, the top and bottom edges of the letters are cut flat to facilitate bonding.

Although letters 57 have been described as bonded in the opening 39 of the belt, it is to be understood that other indicia such as numbers, symbols, etc., may be employed instead.

Thus as can be understood, the layers 25, 27, and 29 and indicia 57 may be cut from stock with automated dies. In addition, the filigreed design 31, and opening 39 may be cut and formed in layer 25 with automated dies and equipment. The sewing of layers 25, 27, and 29 together is done with automated equipment as well as the punching of holes 43, 45, 47, and 49. The only hand operation required is the securing of the buckle 53 and loop 55, and the gluing of indicia 57 which does not require a great deal of skill. A belt thus can be produced efficiently which has a filigreed design and letters in a name plate which exhibits a filigreed effect.

In FIG. 3, the design 31 and letters 57 are not shown, although it is to be understood that the belt will have at least the indicia 57 bonded in the opening 39 as described above.

In practice, the belt member 21 with a blank opening 39 will be produced at a manufacturing facility as well as different types of indicia to be located in the opening 39. The height of the indicia will correspond to the distance between edges 39A and 39B of opening 39 such that the upper and lower edges 59 and 61 of the indicia will engage the edges 39A and 39B of the opening 39 when located therein. The belt member with a blank opening, and with or without a buckle 53 and loop 55 and the precut indicia will be shipped to the retailer. The indicia shipped to the retailer may be many sets of the complete alphabet, many sets of the numbers 0–9, etc. If a customer desires a belt with a special buckle and his name in the opening 39, the retailer merely has to attach the buckle 53 and loop 55 to member 21 and glue in the letters as described above. Thus little skill is required on the part of the retailer yet he can provide a belt which has a filigreed design and individual names or distinctive indicia in the name plate which has a filigreed effect.

Although the belt described has an intermediate layer 29, it is to be understood that layer 29 may be eliminated. In that event, the back sides of the indicia 57 will be glued to the portion of layer 27 exposed through the opening 39.

Although the present invention has been described as applied to a belt, it is to be understood that it could be applied to other leather products or goods.

I claim:

1. A leather product, comprising:
an outer layer attached to second layer means,
an opening formed through said outer layer,
said opening having first and second opposite edges, and
separate indicia means having front and back sides and first and second opposite edges,
said separate indicia means being located in said opening with the back side of said indicia means engaging and being bonded with glue to the layer exposed through said opening and with said first and second opposite edges of said indicia means engaging and being bonded with glue to said first and second opposite edges respectively of said opening.

2. The leather product of claim 1, wherein:
said first and second opposite edges of said opening define peripheral edges of said opening,
said first and second opposite edges of said separate indicia means define peripheral edges of said separate indicia means,
said separate indicia means being located in said opening with the back side of said indicia means engaging and being bonded with glue to the layer exposed through said opening and with said first and second opposite peripheral edges of said indicia means abutting and being bonded with glue to said first and second opposite peripheral edges respectively of said opening.

3. The leather product of claim 2, wherein:
said separate indicia means is bonded only by said glue to said layer exposed through said opening and to said first and second opposite peripheral edges of said opening,
all of said front side of said separate indicia means being viewable when said separate indicia means is bonded to said layer exposed through said opening and to said first and second opposite peripheral edges of said opening.

4. The leather product of claim 3, wherein:
said separate indicia means is flat having flat top and bottom sides.

5. The leather product of claim 2, wherein:
said separate indicia means is flat having flat top and bottom sides.

6. The leather product of claim 1, wherein:
said separate indicia means is bonded only by said glue to said layer exposed through said opening and to said first and second opposite edges of said opening,
all of said front side of said separate indicia means being viewable when said separate indicia means is bonded to said layer exposed through said opening and to said first and second opposite edges of said opening.

7. The leather product of claim 1, wherein:
said separate indicia means is flat having flat top and bottom sides.

8. The leather product of claims 1, 2, 6, 7, 3, 5, or 4 wherein:
said separate indicia means is formed from a flexible material.

9. The leather product of claims 1, 2, 6, 7, 3, 5, or 4 wherein:
said separate indicia means comprises at least one letter of the alphabet cut from a flexible material.

10. The leather product of claims 1, 2, 6, 7, 3, 5, or 4 wherein:
said outer layer is formed of leather,
said second layer means is formed of leather,
said separate indicia means is formed of leather.

11. The leather product of claims 1, 2, 6, 7, 3, 5, or 4 wherein:
said outer layer is formed of leather,
said second layer means is formed of leather,
said separate indicia means comprises at least one letter of the alphabet cut from leather.

12. A leather product, comprising:
an outer layer attached to second layer means,
said outer layer and second layer means being formed of flexible material,
an opening formed through said outer layer,
said opening having first and second opposite peripheral edges, and
separate indicia means formed of flexible material having front and back sides and first and second opposite peripheral edges,
said separate indicia means being located in said opening with said back side of said indicia means engaging and being bonded to the layer exposed through said opening and with said first and second opposite peripheral edges of said indicia means abutting and being bonded to said first and second opposite peripheral edges respectively of said opening.

13. The leather product of claims 2 or 12, wherein:
said separate indicia means and said outer layer engage each other only where said first and second opposite peripheral edges of said indicia means abut said first and second opposite peripheral edges respectively of said opening.

14. A leather product, comprising:
an outer layer attached to second layer means, said outer layer and said second layer means being formed of flexible material, an opening formed through said outer layer, said opening having first and second opposite peripheral edges, separate indicia means formed of flexible material and being bonded to said leather product only by glue, said separate indicia means having front and back sides and first and second opposite peripheral edges, said separate indicia means being located in said opening with said back side of said indicia means engaging and being bonded with glue to the layer exposed through said opening with said first and second opposite peripheral edges of said indicia means abutting said first and second opposite peripheral edges respectively of said opening, said separate indicia means and said outer layer engaging each other only where said first and second opposite peripheral edges of said indicia means abut said first and second opposite peripheral edges respectively of said opening.

15. A belt, comprising:

an outer layer attached to second layer means, an opening formed through said outer layer, said opening having top and bottom edges, and separate indicia means having front and back sides and top and bottom edges, said separate indicia means being located in said opening with said back side of said indicia means engaging and being bonded with glue to the layer exposed through said opening and with said top and bottom edges of said indicia means engaging and being bonded with glue to said top and bottom edges respectively of said opening.

16. The belt of claim 15, wherein:

said first and second opposite edges of said opening define peripheral edges of said opening, said first and second opposite edges of said separate indicia means define peripheral edges of said separate indicia means, said separate indicia means being located in said opening with the back side of said indicia means engaging and being bonded with glue to the layer exposed through said opening and with said first and second opposite peripheral edges of said indicia means abutting and being bonded with glue to said first and second opposite peripheral edges respectively of said opening.

17. The belt of claim 16, wherein:

said separate indicia means is bonded only by said glue to said layer exposed through said opening and to said first and second opposite peripheral edges of said opening, all of said front side of said separate indicia means being viewable when said separate indicia means is bonded to said layer exposed through said opening and to said first and second opposite peripheral edges of said opening.

18. The belt of claim 17, wherein:

said separate indicia means is flat having flat top and bottom sides.

19. The belt of claim 16, wherein:

said separate indicia means is flat having flat top and bottom sides.

20. The belt of claim 15, wherein:

said separate indicia means is bonded only by said glue to said layer exposed through said opening and to said first and second opposite edges of said opening, all of said front side of said separate indicia means being viewable when said separate indicia means is bonded to said layer exposed through said opening and to said first and second opposite edges of said opening.

21. The belt of claim 15, wherein:

said separate indicia means is flat having flat top and bottom sides.

22. The belt of claims 15, 16, 20, 21, 17, 19, or 18 wherein:

said separate indicia means is formed from a flexible material.

23. The belt of claims 15, 16, 20, 21, 17, 19, or 18 wherein:

said separate indicia means comprises at least one letter of the alphabet cut from a flexible material.

24. The belt of claims 15, 16, 20, 21, 17, 19, or 18 wherein:

said outer layer is formed of leather, said second layer means is formed of leather, said separate indicia means is formed of leather.

25. The belt of claims 15, 16, 20, 21, 17, 19, or 18 wherein:

said outer layer is formed of leather, said second layer means is formed of leather, said separate indicia means comprises at least one letter of the alphabet cut from leather.

26. A belt to be worn by a person, comprising:

an outer layer attached to second layer means, said outer layer and said second layer means being formed of flexible material, an opening formed through a portion of said outer layer, said portion of said outer layer being located to face outward when the belt is worn by a person, said opening having top and bottom peripheral edges, and separate indicia means formed of flexible material having front and back sides and top and bottom peripheral edges, said separate indicia means being located in said opening with said back side of said indicia means engaging and being bonded to the layer exposed through said opening and with said top and bottom peripheral edges of said indicia means abutting and being bonded to said top and bottom peripheral edges respectively of said opening.

27. The belt of claim 16 or 26, wherein:

said separate indicia means and said outer layer engage each other only where said top and bottom peripheral edges of said indicia means abut said top and bottom peripheral edges respectively of said opening.

28. A belt to be worn by a person, comprising:

an outer layer attached to second layer means, said outer layer and said second layer means being formed of flexible material, an opening formed through a portion of said outer layer, said portion of said outer layer being located to face outward when the belt is worn by a person, said opening having top and bottom peripheral edges, and separate indicia means formed of flexible material and being bonded to said belt only by glue, said separate indicia means having front and back sides and top and bottom peripheral edges, said separate indicia means being located in said opening with said back side of said indicia means engaging and being bonded with glue to the layer exposed through said opening with said top and bottom peripheral edges of said indicia means abutting said top and bottom peripheral edges respectively of said opening, said separate indicia means and said outer layer engaging each other only where said top and bottom peripheral edges of said indicia means abut said top and bottom peripheral edges respectively of said opening.

29. The belt of claim 28, wherein:

said outer layer and said second layer means have top and bottom edges, the top edges of said outer layer and said second layer means are sewn together with thread, the bottom edges of said outer layer and said second layer means are sewn together with thread.

30. The belt of claim 28, wherein:

said second layer means comprises an inner layer and an intermediate layer, said intermediate layer being exposed through said opening, the back side of said separate indicia means being bonded to said intermediate layer exposed through said opening, said outer layer, said intermediate layer and said inner layer having top and bottom edges, the top edges of said outer layer, said intermediate layer, and said inner layer being sewn together with thread, to bottom edges of said outer layer said intermediate layer, and said inner layer being sewn together with thread.

31. A belt to be worn by a person, comprising:

an outer layer attached to second layer means, said belt having a buckle at one end, an opening formed through a portion of said outer layer, said belt being formed such that said portion of said outer layer faces outward when said belt is worn by a person, said opening being located between the ends of said belt, said opening having top and bottom edges, separate indicia means having front and back sides and top and bottom edges, said separate indicia means being located in said opening with said back side of said indicia means engaging and being bonded to the layer exposed through said opening with said top and bottom edges of said indicia means abutting said top and bottom edges respectively of said opening, said separate indicia means and said outer layer engaging each other only where said top and bottom edges of said indicia means abut said top and bottom edges respectively of said opening.

32. The belt of claim 31, wherein:

said outer layer and said second layer means are sewn together with thread.

33. The belt of claim 32, wherein:

said outer layer and said second layer means are formed of leather.

34. The belt of claim 33, wherein:

said separate indicia means is formed of leather.

35. The belt of claim 34, wherein:

said separate indicia means has its back side bonded with glue to the layer exposed through said opening.

36. The belt of claim 32, wherein:

said separate indicia means is formed of leather.

37. The belt of claim 36, wherein:

said separate indicia means has its back side bonded with glue to the layer exposed through said opening.

38. The belt of claim 32, wherein:

said separate indicia means has its back side bonded with glue to the layer exposed through said opening, said layer exposed through said opening is sewn to said belt with thread.

39. The belt of claim 31, wherein:

said outer layer and said second layer means are formed of leather.

40. The belt of claim 39, wherein:

said separate indicia means is formed of leather.

41. The belt of claim 39, wherein:

said separate indicia means has its back side bonded with glue to the layer exposed through said opening.

42. The belt of claim 31, wherein:

said separate indicia means is formed of leather.

43. The belt of claim 42, wherein:

said separate indicia means has its back side bonded with glue to the layer exposed through said opening.

44. The belt of claim 31, wherein:

said separate indicia means has its back side bonded with glue to the layer exposed through said opening.

45. The belt of claims 31, 32, 39, 42, 44, 33, 34, 35, 36, 37, 38, 40, 41, or 43 wherein:

said separate indicia means comprises a plurality of separate indicia each having its back side engaging and being bonded to the layer exposed through said opening with the top and bottom edges of said separate indicia abutting said top and bottom edges respectively of said opening.

46. The belt of claims 44, 35, 37, 38, 41, or 43 wherein:

said separate indicia means comprises a plurality of separate indicia each having its back side engaging and being bonded with glue to the layer exposed through said opening with the top and bottom edges of said separate indicia abutting and being bonded with glue to said top and bottom edges respectively of said opening, said layer exposed through said opening is sewn to said belt with thread.

47. The belt of claim 31, wherein:

said outer layer and said second layer means have top and bottom edges, the top edges of said outer layer and said second layer means are sewn together with thread, the bottom edges of said outer layer and said second layer means are sewn together with thread.

48. The belt of claim 31, wherein:

said second layer means comprises an inner layer and an intermediate layer, said intermediate layer being exposed through said opening, the back side of said separate indicia means being bonded to said intermediate layer exposed through said opening, said outer layer, said intermediate layer, and said inner layer having top and bottom edges,
the top edges of said outer layer, said intermediate layer, and said inner layer being sewn together with thread,
the bottom edges of said outer layer, said intermediate layer, and said inner layer being sewn together with thread.

49. The belt of claims 28, 31, 29, 30, 47, or 48 wherein:
said opening is an elongated opening having its length extending in a direction along the length of said belt,
the middle of the length of said opening being closer to the middle of the length of said belt than to either end of said belt.

50. A belt to be worn by a person, comprising:
an outer layer attached to second layer means,
said belt having a buckle at one end,
an opening formed through a portion of said outer layer,
said belt being formed such that said portion of said outer layer faces outward when said belt is worn by a person,
said opening being located between the ends of said belt,
said opening having top and bottom edges,
separate indicia means having front and back sides and top and bottom edges,
said separate indicia means being located in said opening with said back side of said indicia means engaging and being bonded to the layer exposed through said opening with said top and bottom edges of said indicia means abutting said top and bottom edges respectively of said opening,
said outer layer, said second layer means and said indicia means being formed of leather.

51. The belt of claim 50, wherein:
said separate indicia means has its back side bonded with glue to the layer exposed through said opening.

52. The belt of claims 50 or 51, wherein:
said outer layer and said second layer means have top and bottom edges,
the top edges of said outer layer and said second layer means are sewn together with thread,
the bottom edges of said outer layer and said second layer means are sewn together with thread.

53. The belt of claims 50 or 51, wherein:
said second layer means comprises an inner layer and an intermediate layer,
said intermediate layer being exposed through said opening,
the back side of said separate indicia means being bonded to said intermediate layer exposed through said opening,
said outer layer, said intermediate layer and said inner layer having top and bottom edges,
the top edges of said outer layer, said intermediate layer, and said inner layer being sewn together with thread,
the bottom edge of said outer layer, said intermediate layer, and said inner layer being sewn together with thread.

54. The belt of claims 50 or 51, wherein:
said opening is an elongated opening having its length extending in a direction along the length of said belt,
the middle of the length of said opening being closer to the length of said belt than to either end of said belt.

55. A belt to be worn by a person, comprising:
an outer layer attached to second layer means,
said belt having a buckle at one end,
an opening formed through a portion of said outer layer,
said belt being formed such that said portion of said outer layer faces outward when said belt is worn by a person,
said opening being located between the ends of said belt,
said opening having top and bottom edges,
separate indicia means having front and back sides and top and bottom edges,
said separate indicia means being located in said opening with said back side of said indicia means engaging and being bonded with glue to the layer exposed through said opening, said top and bottom edges of said indicia means abutting said top and bottom edges respectively of said opening.

56. The belt of claim 55, wherein:
said opening is an elongated opening having its length extending in a direction along the length of said belt,
the middle of the length of said opening being closer to the length of said belt than to either end of said belt.

57. The belt of claim 55, wherein:
said second layer means comprises an inner layer and an intermediate layer,
said intermediate layer being exposed through said opening,
the back side of said separate indicia means being bonded to said intermediate layer exposed through said opening,
said outer layer, said intermediate layer and said inner layer having top and bottom edges,
the top edges of said outer layer, said intermediate layer, and said inner layer being sewn together with thread,
the bottom edges of said outer layer, said intermediate layer, and said inner layer being sewn together with thread,
said inner layer and said outer layer extending along the entire length of said belt.

* * * * *